R. R. JAMES.
Improvement in Car-Brakes and Starters.

No. 128,491.  Patented July 2, 1872.

Witnesses.
H. L. Perrine.
G. B. Towles.

Inventor:
Reuben R. James
By W. Burris Atty 128,491

UNITED STATES PATENT OFFICE.

REUBEN R. JAMES, OF RISING SUN, INDIANA.

IMPROVEMENT IN CAR BRAKES AND STARTERS.

Specification forming part of Letters Patent No. 128,491, dated July 2, 1872.

*To all whom it may concern:*

Be it known that I, REUBEN R. JAMES, of Rising Sun, in the county of Ohio and State of Indiana, have invented a new and Improved Car Brake and Starter, which is fully described and set forth in the following specification and accompanying drawing, in the two figures of which like letters indicate like parts of the invention, and in which—

Figure 1:
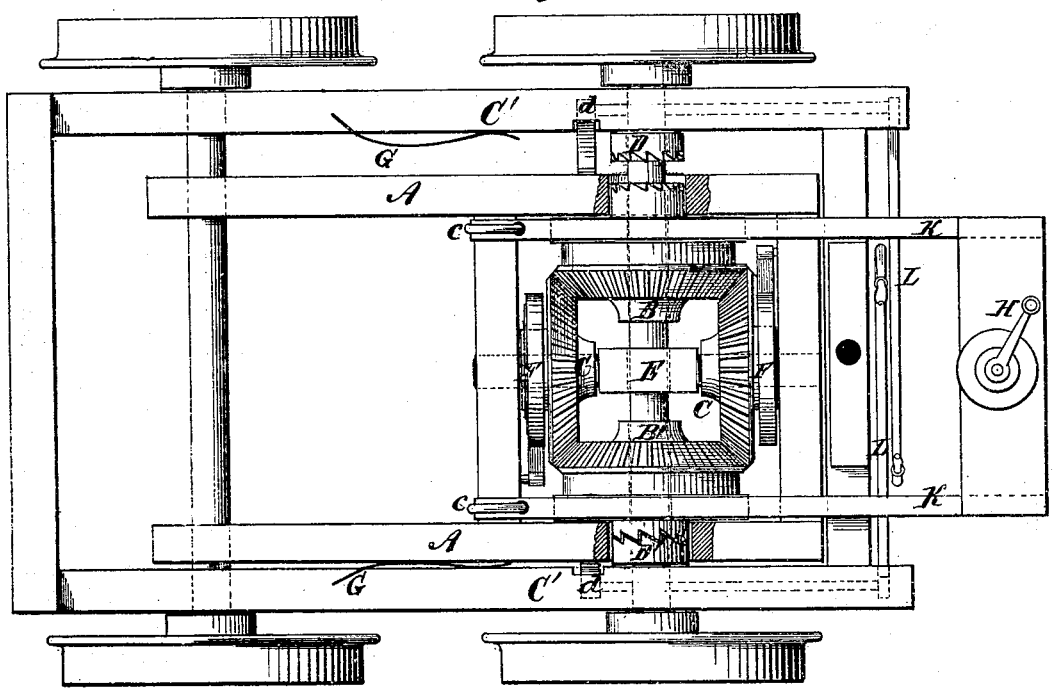
Figure 2:
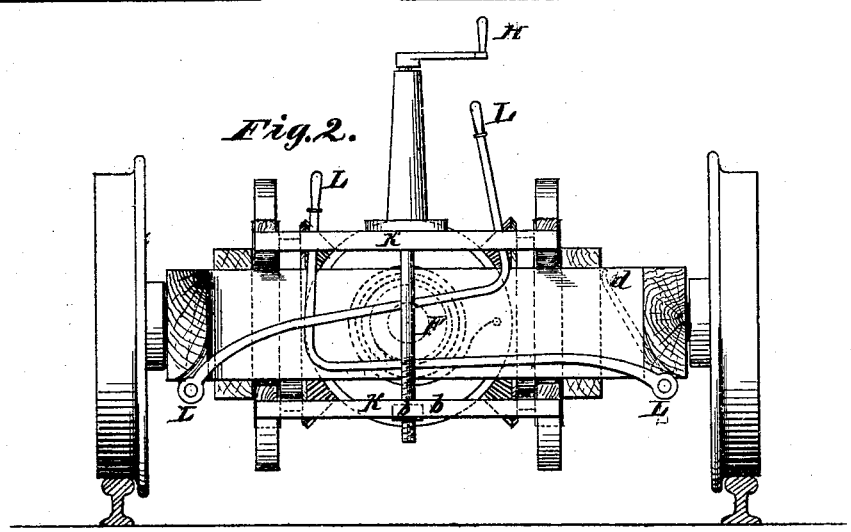

Figure 1 is a top view, and Fig. 2 is a front end view.

Nature.

My invention comprises a car brake and starter; and consists of a brake operated by a lever with a screw, in combination with cog-wheel gearing and coil-springs, arranged in an inner movable frame and connecting with cog-wheels upon the car-shaft, so as to be thrown in and out of gear, by means of levers, for starting and stopping the car. The coil-springs, which constitute the starting power, are attached to the backs of the cog-wheels, so as to be wound up in the process of stopping the car.

A is the inside frame, arranged loosely upon the car-axles. The frame is made enough smaller than the space within the car-frame C′ to allow space for the cog-wheels to be moved in and out of gear, as required for the operation of the brake and starter. B B′ and C C are four beveled connecting cog-wheels, arranged upon transverse axles. Wheels B B′ are arranged to revolve upon the front axle of the car, and are provided with cogs on the backs to engage the small cog-wheels D D′ upon the car-axle. Wheels C C are arranged to revolve upon a transverse axle, having a middle part, E, large enough for a hole of sufficient size to allow the car-axle to pass through and revolve within it. (See Fig. 1.) F F are coil-springs attached to the frame A and to the backs of wheels C C, so that when the small wheel D is thrown in gear with wheel B the forward movement of the car winds up the springs, which forms the starting force. G G are springs attached to the inner sides of the car-frame to hold the cog-wheels B and D and B′ and D′ out of gear while the car is in motion. H is the brake-lever, on the lower end of which is a screw arranged to work in a nut, b, attached to the under side of the lower cross-beam of the brake-frame. The upper part of the lever is provided with a collar or shoulder arranged to bear upon the upper cross-beam of the brake-frame. (See Fig. 2.) K is the brake-frame, made with upper and lower beams, and arranged to bear upon the upper and lower sides of wheels B B′. The back ends of the frame are held by bars or hooks c c. (See Figs. 1 and 2.) L L′ are gear-levers, the forward ends of which extend above the car-floor, as seen in Figs. 1 and 2. These levers are bent so as to extend under and along the side beams of the car-frame C′, to which they are attached, and the back part of the levers are bent so that the ends d d extend up between the frames A and C′, as seen in Figs. 1 and 2.

When the operator desires to stop the car he presses upon the left lever L, which moves the frame A to the left, throwing cog-wheel B in gear with the small cog-wheel D, and the forward movement of the car revolves wheels C C, which winds up the coil-springs. The brake-lever H is then turned to the right till the brakes bear sufficiently upon wheels B B′ to stop and hold the car; and when the operator is ready to start the car again he presses upon the right-hand lever L′, which moves the inner frame to the right, throwing wheels B′ and D′ in gear and wheels B and D out of gear, as seen in Fig. 1. He then turns the brake-lever H to the left till the brakes are loosened, and, by the force of the coil-springs upon wheels C C, the wheel B′ is turned forward, thus automatically starting the car.

I claim—

1. The combination of the brake-devices H K upon movable frame A, with wheels B B′ C C D D′, springs F F, and levers L L′, for stopping and automatically starting a railroad car, substantially as described.

2. The springs G G, in combination with frames A C′, as described.

In attestation of the foregoing specification of my improved brake for railway cars I hereto subscribe my name in presence of two witnesses.

REUBEN R. JAMES.

Witnesses:
DAN. S. DOWNEY,
J. M. REISTER.